B. C. ROWELL, DEC'D.
L. C. ROWELL, EXECUTRIX.
BRAKE SHOE.
APPLICATION FILED SEPT. 7, 1915.
1,187,469.
Patented June 13, 1916.
3 SHEETS—SHEET 2.
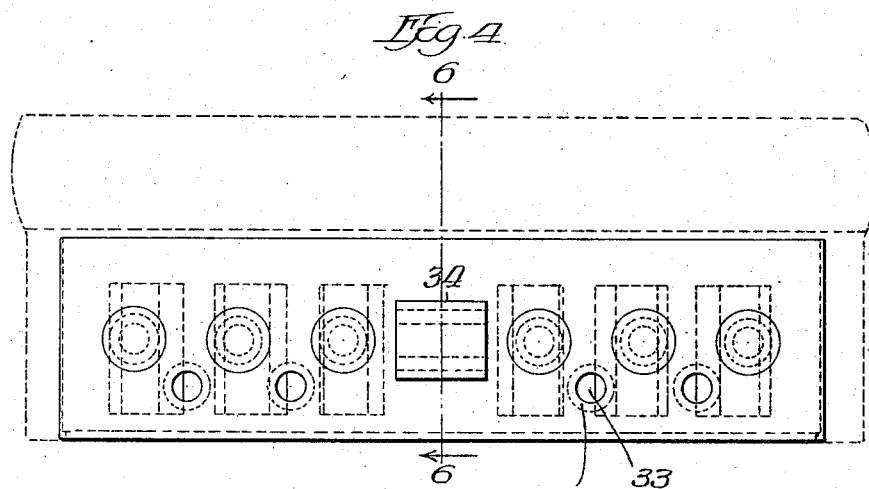
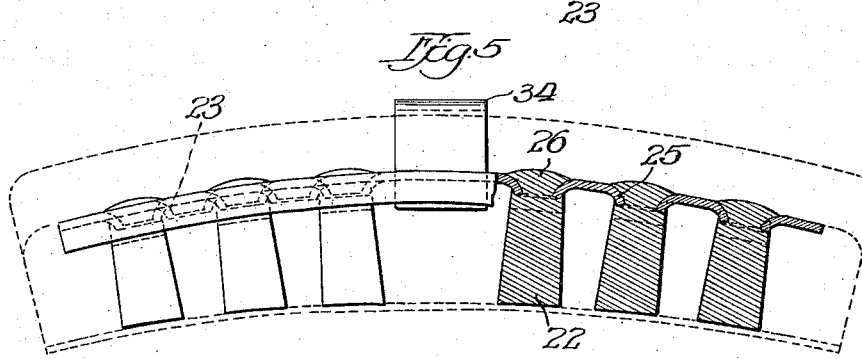
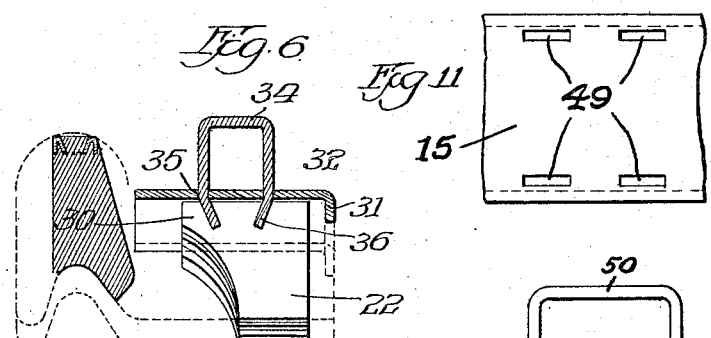
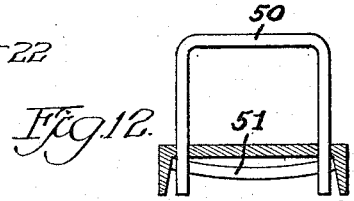

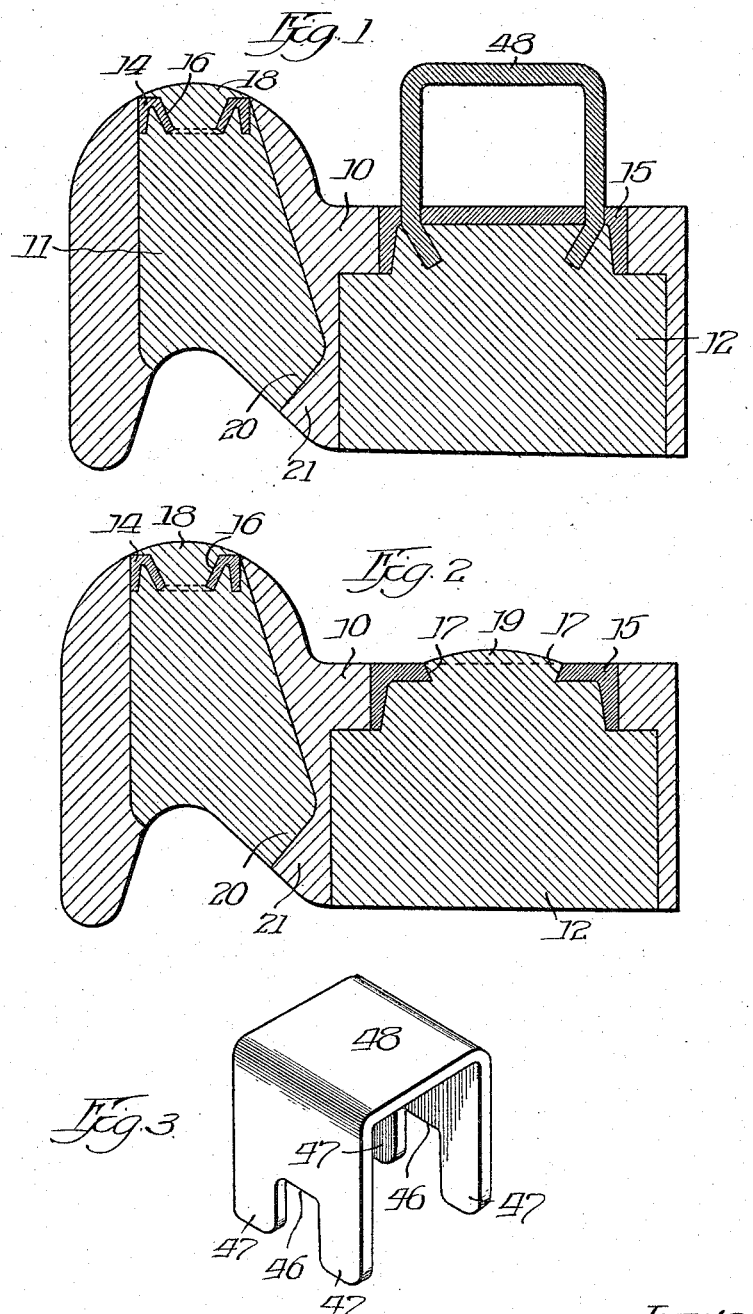

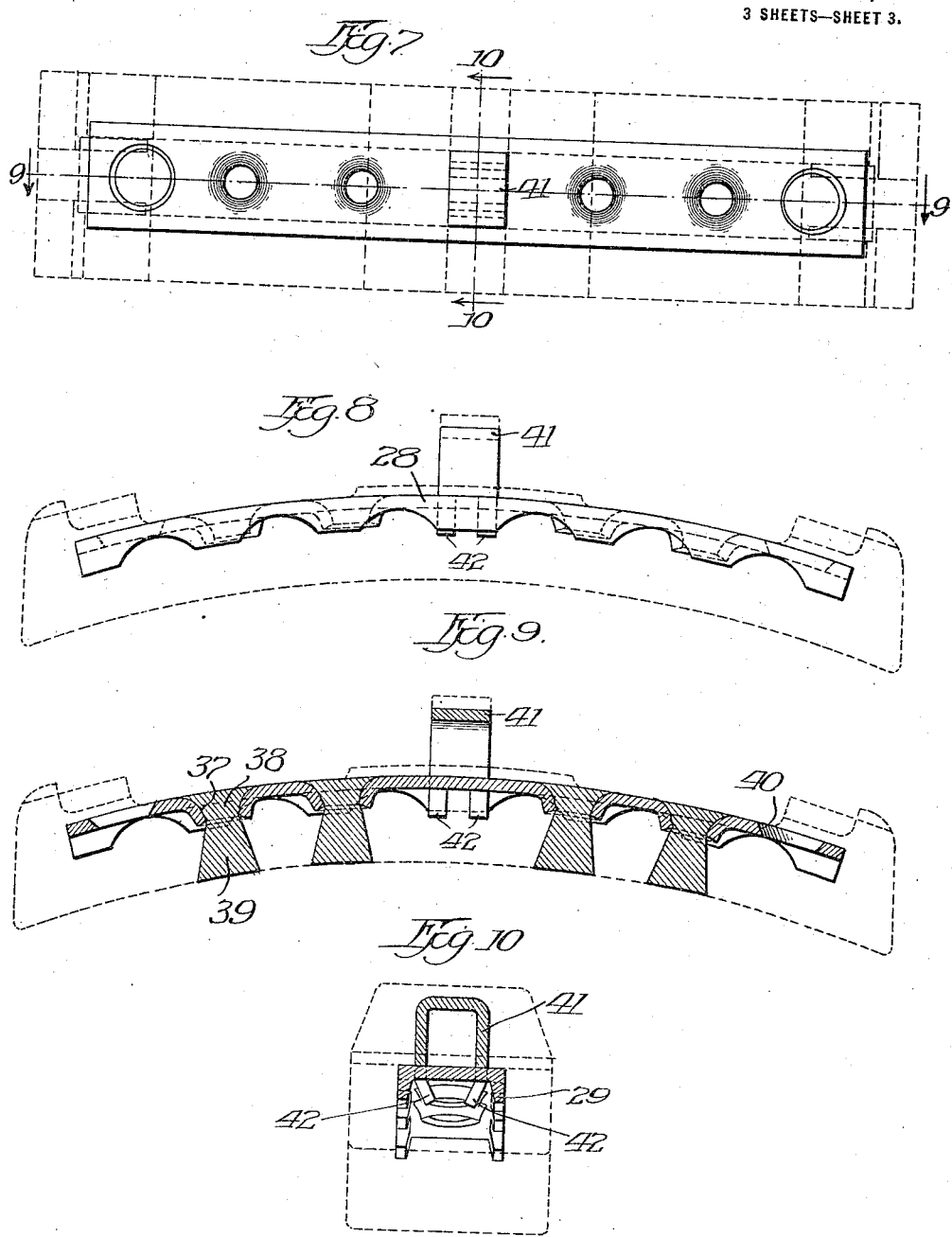

UNITED STATES PATENT OFFICE.

BENTON C. ROWELL, DECEASED, LATE OF CHICAGO, ILLINOIS, BY LILLA C. ROWELL, EXECUTRIX, OF CHICAGO, ILLINOIS.

BRAKE-SHOE.

1,187,469.  Specification of Letters Patent.  Patented June 13, 1916.

Continuation in part of application Serial No. 50, filed January 2, 1915. This application filed September 7, 1915. Serial No. 49,271.

*To all whom it may concern:*

Be it known that BENTON C. ROWELL, late a citizen of the United States residing at Chicago, in the county of Cook and State of Illinois, did invent certain new and useful Improvements in Brake-Shoes, of which the following is a specification.

The present invention relates to brake shoes, such as are commonly used on railway rolling stock, and more particularly to brake shoes for this purpose which are reinforced and contain wear resistant inserts of harder material than the body of the shoe.

This application is in part a continuation of application, Serial Number 50, filed January 2nd, 1915.

The principal objects of the present invention are to provide improved means for connecting the strap or supporting lug to the body of the shoe; to provide improved reinforcement for the body of the shoe; to provide improved means for connecting the wearing inserts to the reinforcement and the body of the shoe; to provide improved means for preventing the falling of portions of the brake shoe upon the track in case of fracture; to provide improved means for preventing the separation of the component parts of the shoe as the result of excessive wear; to provide improved means for connecting reinforcing members of inverted channelled cross section to the other portions of the shoe, and generally, to improve, cheapen and simplify the construction of brake shoes for railway and other vehicles. In attaining these and other objects and advantages to be hereinafter set forth, there is provided a construction three embodiments of which are illustrated in the accompanying drawings, in which:—

Figure 1 is a vertical transverse section through a brake shoe and its attaching lug constructed in accordance with the present invention, showing the attaching lug and the manner of connecting the same to the shoe; Fig. 2 is a transverse section through a different portion of the shoe shown in Fig. 1 illustrating the manner in which the wearing inserts are connected to the reinforcement; Fig. 3 is a perspective view of the strap or supporting lug before it has been brought into engagement with the reinforcement; Fig. 4 is a plan view of an alternative form of reinforcement with wearing inserts attached thereto, the body of the shoe being indicated in dotted lines; Fig. 5 is a side elevation of the reinforcement and wearing inserts attached thereto shown in Fig. 4, partly in section, the body of the shoe being indicated in dotted lines; Fig. 6 is a vertical transverse section on the line 6—6 of Fig. 4; Fig. 7 is a plan view of a further form of reinforcement, the body of the shoe being indicated in dotted lines; Fig. 8 is a side elevation of the shoe as shown in Fig. 7; Fig. 9 is a longitudinal vertical section on the line 9—9 of Fig. 7; Fig. 10 is a vertical transverse section on the line 10—10 of Fig. 7; Fig. 11 is a plan view of a portion of the reinforcement shown in Figs. 1 and 2; and Fig. 12 illustrates an alternative form of attachment for the supporting lug.

Reference will now be made to Figs. 1 to 3 which illustrate the first of the various forms of reinforcement. The shoe consists of a body portion 10 provided with two series of wearing inserts 11 and 12. The first set of inserts 11 is arranged over the flange of the wheel, while the second set of wearing inserts 12 is arranged to contact with the thread portion of the wheel. These wearing inserts are preferably made of harder metal than the body of the shoe. The brake shoe is reinforced by means of inverted channel members 14 and 15, preferably arranged as shown along the upper surface of the brake shoe. Although the reinforcement as shown is in contact with the body of the shoe on its vertical and under surfaces only, it is connected to the body portion by means of the wearing inserts through the connection between the two latter. For connecting the inserts to the reinforcement, apertures 16 and 17 are provided in the reinforcing members 14 and 15, respectively, through which upwardly extending projections 18 and 19 of the wearing inserts extend. To enable these projections to grip the reinforcement the edges of these apertures are formed with conical sides so as to provide countersunk apertures adapted to engage the complementarily formed ends 18 and 19 of the inserts. In the case of the apertures 17 the conical shape is obtained by cutting the metal of the reinforcement and not by bending it downwardly, as in the case of the aperture 16 in the reinforcement 14. This gives a simpler construction and has the further advantage that the body of the brake shoe may be worn farther away before the reinforcement loses its grip of the wearing inserts than in the case of the apertures formed by bending the surrounding metal downward. In the latter case as soon as the shoe is worn away to the bottom of the depressed edges of the apertures so formed, the conical parts of the wearing inserts extending therethrough are completely severed from the other parts of the inserts so that the latter are free to fall on the rails.

The reinforcement may be connected directly to the body of the shoe by means of apertures arranged in the reinforcement intermediate the inserts as shown in Fig. 4. The lower ends of the inserts 11 are shaped so as to form an inwardly inclined surface 20 against which the portion 21 of the body of the brake shoe bears.

In order to enable the supporting lug, reinforcement and wearing insert to be securely locked together until the shoe has been worn so thin that there is practically nothing left except the back reinforcement, not only are the sides of the apertures 17 limited to the thickness of the reinforcement, but the lug 48 is attached to the reinforcement in such a manner that it will remain connected to the reinforcement until the body portion and wearing inserts are practically worn away. The lug 48 is provided with forked ends 47 adapted to be passed through slots 49 (see Fig. 11) in the upper surface of the reinforcement 15 so as to bring the portions 46 between the ends 47 into engagement with the upper portion of the reinforcement 15 between the slots. After the ends 47 have been so passed through their respective slots, they are bent inwardly, as shown in Fig. 1, in order to prevent the lug becoming separated from the reinforcement. A wearing insert is then cast around the ends of the lug in order to lock them securely in position.

An alternative form of attachment for the supporting lug is shown in Fig. 12. In this case the ends of the lug 50 are passed through slots in the reinforcement and locked in position by means of a member 51 passed through apertures or recesses in the reinforcement.

In the form of construction shown in Figs. 4 to 6 a series of wearing inserts 22 are provided adjacent the outer edge of the brake shoe in order that they may bear against that part of the flat surface of the wheel which has the least wear. The inserts have cast engagement with the reinforcement 32 by means of swaged apertures 25 through which the portions 26 of the inserts project. These wearing inserts are preferably formed with a laterally projecting portion 30 adjacent the reinforcement 32 one advantage of which is to give a large bearing surface on the under side of the reinforcement, while also enabling the insert to be connected to the center of the reinforcement. Preferably, as shown, these inserts are made of greater width (longitudinally of the shoe) adjacent their lower ends than adjacent their upper ends in order that they may exert a wedging action on the body of the brake shoe and thus prevent, so far as possible, the falling of fractured pieces on the tracks.

The reinforcement 32 itself consists of a curved sheet of metal having a flange 31 externally arranged with respect to the body of the brake shoe so as to protect the outer corner of the same. The reinforcement is connected to the body of the shoe not only indirectly as the result of the engagement between the body of the shoe and the reinforcing inserts, but also directly by means of swaged apertures 23 in the reinforcement through which projecting portions 33 of the brake shoe extend.

A strap 34 is provided, the ends 36 of which are passed through slots 35 in the reinforcement and subsequently bent inwardly, as shown in Fig. 6.

Figs. 7 to 10 illustrate a still further form of construction in which the channel reinforcement 28 is so formed that even should sections of the body of the shoe or insert be loosened from the remainder of the shoe, they will be prevented from moving longitudinally with respect to the shoes and consequently prevented from falling from one or other ends thereof. This result is obtained by employing reinforcement having downwardly projecting flanges 29 with serrated edges, the projecting portions of which are adapted to engage fragments of the brake shoe and hold them loosely between the wheel and the reinforcement instead of allowing them to slide longitudinally between the wheel and the reinforcement until they can fall onto the rail.

The reinforcement 28 is provided with apertures 37 through which extend the projecting portions 38 of the wearing inserts 39. Conically sided apertures 40 are also provided for uniting the reinforcement to the body of the shoe.

The strap 41 forming part of the supporting lug is provided with forked ends 42 connected to the reinforcement in the manner described in connection with Figs. 1 to 3.

Having thus described the invention and illustrated its use, what is claimed as new and desired to be secured by Letters Patent is:—

1. A brake shoe comprising, in combination, a body portion, a reinforcing member having pairs of apertures therein, and a ductile strap member having its sides substantially parallel to the sides of the shoe body, and having its ends cut away to form forked portions adapted to project through said apertures, said portions being bent after insertion through said apertures to prevent disengagement.

2. A brake shoe comprising, in combination, a body portion, a reinforcing member of inverted channelled cross section having pairs of apertures therein, and a strap member having forked ends adapted to project through said apertures, said ends being bent after insertion through said apertures to prevent disengagement.

3. A brake shoe comprising, in combination, a body portion, and a reinforcing member of inverted channelled cross section the flanges of which have indented lower edges.

4. A brake shoe comprising, in combination, a body portion and a reinforcing member of inverted channelled cross section of less width than said shoe and substantially centrally arranged therein, the flanges of said reinforcement having indented lower edges.

5. A brake shoe comprising, in combination, a body portion, a reinforcing member embedded therein adjacent the upper surface thereof, and a series of wearing inserts having portions engaging said reinforcing member, said portions being laterally offset in the same direction with respect to the wearing surfaces of said inserts.

6. A brake shoe comprising, in combination, a body portion adapted to contact with both the flange and tread portions of the wheel, a reinforcing member embedded therein adjacent the upper surface thereof and substantially opposite the tread portion of the wheel, and a wearing insert having a portion engaging said reinforcing member, said portion being laterally offset with respect to the wearing surface of said insert.

7. A brake shoe comprising, in combination, a body portion, a reinforcing member embedded therein adjacent the upper surface thereof and substantially opposite the tread portion of the wheel, and a wearing insert adapted to contact with the portion of the wheel farthest from the flange, and having a portion engaging said reinforcing member, said portion being laterally offset with respect to the wearing surface of said insert.

In testimony whereof I have hereunto signed my name in the presence of the two subscribing witnesses.

LILLA C. ROWELL,
*Executrix of last will and testament of Benton C. Rowell, deceased.*

Witnesses:
RIDSDALE ELLIS,
DONALD C. WILLIAMS.

Copies of this patent may be obtained for five cents each, by addressing the "Commissioner of Patents, Washington, D. C."